United States Patent [19]

Foley et al.

[11] 3,944,515

[45] Mar. 16, 1976

[54] MOLDING COMPOUNDS

[75] Inventors: Kevin M. Foley, Hebron; Frank Paul McCombs, Granville; Reuben H. Bell, Cincinnati, all of Ohio

[73] Assignee: Owens-Corning Fiberglas Corporation, Toledo, Ohio

[22] Filed: Nov. 18, 1974

[21] Appl. No.: 524,721

[52] U.S. Cl. .................... 260/38; 106/90; 260/29.3
[51] Int. Cl.$^2$ .................... C08K 3/30; C08L 61/10
[58] Field of Search ............... 106/90; 260/38, 29.3

[56] References Cited
UNITED STATES PATENTS

| | | | |
|---|---|---|---|
| 2,152,670 | 4/1939 | Shutt | 106/90 X |
| 3,216,966 | 11/1965 | Collins et al. | 260/38 |
| 3,240,736 | 3/1966 | Beckwith | 260/38 X |
| 3,415,774 | 12/1968 | Hood et al. | 260/38 |
| 3,502,610 | 3/1970 | Thompson | 260/38 X |
| 3,663,720 | 5/1972 | Thompson | 106/90 X |
| 3,666,703 | 5/1972 | Murata et al. | 260/38 X |
| 3,785,839 | 1/1974 | Peppler et al. | 106/90 |

*Primary Examiner*—M. J. Welsh
*Assistant Examiner*—S. M. Person
*Attorney, Agent, or Firm*—John W. Overman; Patrick P. Pacella

[57] ABSTRACT

A method for producing a phenolic molding is disclosed. The method includes the steps of mixing phenol, formaldehyde and a hydraulic cement, forming the resulting composition to a predetermined shape and maintaining the composition in the predetermined shape until an insoluble, infusible article is formed by condensation. At least 10 percent of the hydraulic cement must be Portland cement. The mole ratio of formaldehyde to phenol must be at least 1:1, and the amount of hydraulic cement must be sufficient for reaction with from 1 to 9 times the sum of the water of condensation of the phenol with the formaldehyde and the water charged to the mix. The use of reinforcing glass fibers in producing phenolic moldings is also disclosed, as well as the use of urea and resorcinol in addition to the phenol, formaldehyde and hydraulic cement.

7 Claims, No Drawings

MOLDING COMPOUNDS

BACKGROUND OF THE INVENTION

The production of phenolic moldings is an old art, having involved, over the years, the use of two different types of phenol-formaldehyde condensate: novolacs and resoles. The novolacs were produced by condensing formaldehyde and phenol in a mole ratio of about 1:1 or slightly less, and usually in the presence of an acidic condensing agent. Condensation was carried essentially to completion, so that the novolac became water insoluble and could be separated from associated water and used to formulate a molding compound by mixing with a curing agent, usually hexamethylenetetraamine and other additives such as fillers, reinforcements and mold release agents. Moldings were then produced in matched molds by the "heat pressure" method disclosed an an early Baekeland patent.

Moldings have also been made by a casting technique from resoles: partial condensates of formaldehyde and phenol in a higher mole ratio, usually at least about 1.5:1; condensation is caused by heating, usually in the presence of a fixed alkali condensing agent. Condensation is interrupted at a desired end point by discontinuing heating and acidifying to a desired pH at which room temperature condensation is comparatively slow. The casting can then be produced from the partial condensate by adding a "hardener," e.g., a solution of hydrochloric or phosphoric acid in glycerine or in a glycol, and pouring the resulting composition into a mold. Cure proceeds at ambient or a slightly higher temperature. A detailed discussion of phenol-formaldehyde condensates appears in the *The Chemistry of Phenolic Resins*, Martin, John Wiley & Sons, Inc. 1956, and cited references. Aside from a wide variety of hydraulic cements we can also employ magnesium oxysulfate cements, magnesium oxychloride cement and gypsum cements. Briefly, hydraulic cements are those inorganic cements which set and harden by the addition of water. Specific examples of hydraulic cements include aluminous cements, masonry cements, natural cements, Portland cements, Portland blast furnace slag cements, Portland-pozzolan cement and slag cement. Preferably, Portland cement is used alone or in conjunction with the other cements.

It has also been suggested* that laminates, coatings, moldings and expanded foams can be produced from a polyhydric phenol-aldehyde resin containing 2–6 percent hydraulic cement, based on the weight of the polyhydric phenol. The cement is said to lower the viscosity of the resin and to give it high temperature strength and fire retarding properties.

* U.S. Pat. No. 3,502,610.

DETAILED DESCRIPTION OF PREFERRED EMBODIMENTS

The following Examples illustrate preferred embodiments of the instant invention, Example 1 constituting the best mode presently known to the inventors. In the Examples, as elsewhere herein, the terms "percent" and "parts" refer to percent and parts by weight, unless otherwise indicated.

EXAMPLE 1

A phenol-urea-formaldehyde condensate was produced from 1,240 parts phenol, 2,600 parts 52 percent formaldehyde, 2,500 parts Portland cement, 1,290 parts urea, 2,500 parts gypsum cement, 2,500 parts alumina, 400 parts zinc stearate and 800 parts ice. The phenol, formaldehyde, urea and 100 parts of the Portland cement were charged to a stainless steel vessel equipped with a propeller type agitator and an indirect heat exchanger. This charge was agitated for 18 hours, during which time cooling water was circulated through the indirect heat exchanger to maintain the temperature of the charge at about 68°C. After the preliminary 18 hour reaction period, the rest of the Portland cement, the gypsum, the alumina, the zinc stearate and the ice were added to the reactant products in the vessel. The resulting composition, which was a phenol-formaldehyde condensate was co-deposited with chopped glass fiber strand* on a moving polyester film approximately 24 inches in width and of indefinite length. A second polyester film, also 24 inches in width and of indefinite length was brought into contact with the upper surface of the sheet-like mass of deposited glass fibers and phenol-formaldehyde condensate, and was moved with the mass and the first sheet. Sheets called "Sheet Molding Compound," of the mass of condensate and glass fibers approximately 24 inches by 20 inches by one-eighth inch were cut from the mass, leaving the polyester films on each of the two major sides thereof. Moldings were produced from these sheets between matched flat dies: five minutes at 300°F. and 283 pounds per square inch.

*The fibers were made of a glass containing about 54 percent $SiO_2$, 14 percent $Al_2O_3$, 4.5 percent MgO, 17.5 percent CaO and 10 percent $B_2O_3$. They were coated with a polyester size containing a lubricant and gamma-aminopropyltriethoxysilane.

Sheets produced as described above were tested for flexural modulus, for flexural strength, for tensile strength* and for notched Izod impact strength****: (1) as molded; (2) after they had been autoclaved for 16 hours at 227°F., and (3) after they had been immersed in boiling water for two hours. Results of this testing are summarized in the following Table for several ratios of glass fibers to phenol-formadehyde condensate.

**ASTM D-790.
***ASTM D-638.
****ASTM D-256.

| Sample Designation | Resin density* on film | Glass fiber density on film* |
| --- | --- | --- |
| 1 | 341 | 75 |
| 2 | 341 | 60 |
| 3 | 341 | 45 |
| 4 | 341 | 30 |
| 5 | 341 | 27 |

*Units $g/ft^2$

| Sample Designation | PSI × 10³ Flexural Strength | | | PSI × 10⁶ Flexural Modulus | | | PSI × 10³ Tensile Strength | | | Ft.lbs/in. Notched Izod Impact Strength | | |
| --- | --- | --- | --- | --- | --- | --- | --- | --- | --- | --- | --- | --- |
| | A* | B** | C*** | A | B | C | A | B | C | A | B | C |
| 1 | 7.15 | 8.21 | 5.87 | 1.057 | 0.871 | 0.913 | 3.16 | 3.36 | 2.71 | 9.036 | 9.541 | 9.473 |
| 2 | 7.28 | 6.51 | 5.36 | 0.983 | 0.703 | 0.777 | 3.02 | 3.14 | 2.31 | 6.963 | 6.933 | 7.888 |
| 3 | 5.21 | 5.52 | 4.68 | 0.727 | 0.545 | 0.606 | 2.29 | 2.16 | 1.61 | 4.563 | 5.925 | 6.899 |

-continued

| Sample Designation | PSI × 10³ Flexural Strength | | | PSI × 10⁶ Flexural Modulus | | | PSI × 10³ Tensile Strength | | | Ft.lbs/in. Notched Izod Impact Strength | | |
|---|---|---|---|---|---|---|---|---|---|---|---|---|
| | A* | B** | C*** | A | B | C | A | B | C | A | B | C |
| 4 | 4.04 | 4.62 | 3.76 | 0.557 | 0.559 | 0.495 | 1.35 | 1.50 | 1.26 | 4.903 | 4.589 | 5.582 |
| 5 | 4.12 | 3.75 | 2.71 | 0.571 | 0.356 | 0.426 | 1.29 | 1.24 | 0.99 | 3.062 | 3.667 | 4.617 |

*As molded
**After 16 hours of autoclaving at 227°F.
***After two hours in boiling water It has been found that the phenolic condensate produced as described above has a shelf life sufficiently long, under ordinary ambient conditions, that Sheet Molding Compound produced therefrom within four hours is satisfactory, and the sheet molding compound, itself, has a shelf life greater than three weeks. It will be appreciated that this is adequately long to make ordinary use of the material for producing sheets or other moldings entirely feasible.

The data in the foregoing Table show an unexpected result: a comparatively slight decrease in the strength of the moldings, as indicated by the data, after two hours of autoclaving at 227°F. and after two hours in boiling water, indicates that the glass fibers were not appreciably affected by the cement. This is unexpected because glass fibers of the indicated composition, distributed in reinforcing relationship with a hydrated mixture of equal parts of Portland and Gypsum cements, would be at least virtually destroyed by sixteen hours of autoclaving at 227°F. The data in the foregoing Table, on the other hand, indicate not more than slight deterioration of the fibers during either autoclaving or boiling.

It has been found that the relative proportions in which the hydraulic cement or cements, phenol and formaldehyde can be used in practicing the method of the instant invention can be varied within comparatively wide limits. For example, in one series of experiments, where the formaldehyde to phenol ratio was held constant at 3:1, it was found that a curable, workable phenol-formaldehyde condensate could be produced when the amount of Portland cement charged varied from one to nine times the weight of the sum of the weight of the water charged to the condensation reaction and three-fifths of the weight of the formaldehyde so charged. Preferably the weight of hydraulic cement is from about one and a half to about five times this sum and, most desirably, from about two to four times this sum.

It has also been found that the mole ratio of formaldehyde to phenol can be varied within wide limits in producing a molding according to the method of the invention. Indeed, in one sense, there is no upper limit on this ratio because Portland cement has been found to cure formaldehyde to an infusible condition. As a practical matter, it is usually preferred that the mole ratio of formaldehyde to phenol be from about 1.5:1 to about 4.5:1, most desirably from about 2:1 to about 4:1. It has been found that resorcinol can be used in producing a phenol-formaldehyde condensate and a phenolic molding according to the invention. In general, the use of resorcinol accelerates the reactions, both of those involved in producing the original condensate and those involved in producing the final molding. Accordingly, resorcinol, when employed, is preferably used in amounts ranging from about 1 percent to about 70 percent of the phenol originally charged, most desirably from about 3 percent to about 10 percent thereof.

Several experiments were conducted to determine the relative proportions in which Portland cement and gypsum cement can be used in producing molding compounds and moldings according to the invention. It had previously been determined that 100 percent of Portland cement was operable. Accordingly, in this series of experiments, the ratio $g/(g+g')$, where $g$ represents the number of grams of Portland cement used and $g'$ represents the number of grams of gypsum used, was varied between 0.5 and 0. In these experiments, the mole ratio of phenol to formaldehyde was held constant at 3:1 and, apart from the proportions of Portland cement to gypsum, substantially the procedure described in Example 1, above, was followed. The systems explored were those where the indicated ratio was 0.5, 0.4, 0.3, 0.2, 0.1 and 0.0. Only the experiment where the ratio was 0.0 failed to cure, although the final moldings produced from the system where the ratio was 0.1 were somewhat pliable after final cure. Accordingly, the minimum value for the indicated ratio should be 0.1. Preferably, the ratio is from about 0.2 to 1 and, most desirably, from about 0.4 to about 0.6.

It will be noted that urea was used in producing moldings according to the invention as described above in Example 1. It has been found that such use of urea is advantageous because of (a) the moderating effect the urea has on reaction rates, both during the initial condensation and during final cure to produce a molding and (b) because the urea acts as a fire retardant. To demonstrate the excellent fire resistance of moldings produced according to the method of the instant invention, panels were produced and were tested for flame spread, fuel contributed and smoke developed in comparison with panels which presently are being produced commercially. The panels according to the invention were produced from a phenol-urea-formaldehyde condensate produced as described in Example 1, above, from the charge there set forth plus 20 parts 1,2-bis-trimethoxysilylethane. Sheets were produced as described in Example 1 from the resulting condensate and glass fibers* codeposited with the condensate in such proportions that the glass fibers constituted substantially 22 percent of the condensate and fibers. Panels 21 inches by 24 inches by ⅛ inch were then molded from the resulting sheets: 290°F. for 5 minutes at 60 tons pressure. These panels were tested, ASTM E-84 tunnel test against panels which are presently being marketed, with the following results.

*The glass fibers were made of a glass having the composition set forth in Example 1 above, and coated with a polyester size containing gammamethacryloxypropyltrimethoxysilane.

| | Panels Produced According to the Invention | Present Commercial Panels |
|---|---|---|
| Flame Spread | 20 | 90 to 110 |

|  | Panels Produced According to the Invention | Present Commercial Panels |
|---|---|---|
| Fuel Contributed | 0 | 25 to 50 |
| Smoke Developed | 2 | 400 to 500 |

In each case, a low number for the E-84 tunnel test indicates better performance than does a higher number.

It will be appreciated that urea is preferably used in producing a molding according to the invention. When used, urea should constitute at least 10 percent, based upon the weight of the phenol employed, preferably at least 50 percent and, most desirably, at least 75 percent. Ordinarily, there is no reason to employ more than 150 percent of urea, on the stated basis, although even greater amounts are not particularly detrimental. It has been found that a molding can be produced according to the method of the invention containing about 50 percent of urea, on the stated basis, and using formaldehyde and phenol in a 1:1 mole ratio. However, when urea is increased above about 50 percent, on the stated basis, the mole ratio of formaldehyde to phenol should be increased above 1:1 by about 1 per 100 percent of added urea, above 50 percent.

What we claim is:

1. A method for producing a phenolic molding which includes the steps of mixing phenol, formaldehyde and a hydraulic cement at least 10 percent of which is Portland cement in such proportions that the mole ratio of formaldehyde to phenol is at least 1:1 and the weight of the hydraulic cement is from one to nine times the sum of the weight of the water charged to the mix and three-fifths of the weight of the formaldehyde charged to the mix, forming the resulting composition to a predetermined shape and maintaining the composition in the predetermined shape until an insoluble, infusible article is formed by condensation.

2. A method as claimed in claim 1 in which the composition is subjected to a temperature above ambient and to super-atmospheric pressure while maintained in the predetermined shape.

3. A method as claimed in claim 2 wherein the composition additionally contains from 10 percent to 150 percent of urea, based upon the weight of the phenol.

4. A method as claimed in claim 1 wherein the composition additionally contains from 1 percent to 70 percent of resorcinol, based upon the weight of the phenol.

5. A method as claimed in claim 3 wherein the mole ratio of formaldehyde to phenol is from about 1.5:1 to about 4.5:1, the weight of hydraulic cement is from about 1½ to about 5 times the sum of the weight of the water charged to the mix and three-fifths of the weight of the formaldehyde charged to the mix, and wherein the initial mix is maintained at a temperature not higher than about 125°F. until partial condensation occurs, the partial condensate and glass fibers are collected on a carrier sheet, and the condensate is formed to an insoluble, infusible article with the glass fibers in reinforcing relationship therein.

6. A method as claimed in claim 5 wherein the phenol, formaldehyde, urea and a portion of the Portland cement ranging from about two one-hundredths to two-tenths of the sum of the weight of the water charged to the mix and three-fifths of the weight of the formaldehyde charged to the mix are maintained at a temperature not higher than about 125°F. for from 10 to 24 hours, and wherein the remainder of the Portland cement and of the Gypsum cement, if any, are then added to the reaction mixture while the temperature thereof is maintained not higher than about 125°F., and wherein it is the resulting partial condensate that is collected with glass fibers and formed into an insoluble, infusible article.

7. A phenolic molding produced by the method of claim 1.

* * * * *